US006556886B1

(12) United States Patent
Riva et al.

(10) Patent No.: US 6,556,886 B1
(45) Date of Patent: Apr. 29, 2003

(54) METHOD AND DEVICE FOR CONTROLLING A MACHINE TOOL, IN PARTICULAR, A DIE-SINK EROSION MACHINE

(75) Inventors: Luciano Riva, Verbania-Intra (IT); Alberto Marchesi, Gordevio (CH)

(73) Assignee: Agie SA, Losone (CH)

( * ) Notice: Subject to any disclaimer, the term of this patent is extended or adjusted under 35 U.S.C. 154(b) by 0 days.

(21) Appl. No.: 09/453,793

(22) Filed: Dec. 3, 1999

(30) Foreign Application Priority Data

Dec. 4, 1998 (DE) .......................................... 198 56 116

(51) Int. Cl.[7] .............................................. G06F 19/00
(52) U.S. Cl. ........................ 700/162; 700/181; 700/179; 219/69.17
(58) Field of Search ................................ 700/186, 162, 700/173–176, 179, 181, 182, 187, 189, 193, 180, 86, 87; 318/561, 572; 483/8–11, 64, 4; 219/69.13, 69.11, 69.17, 69.15

(56) References Cited

U.S. PATENT DOCUMENTS

| 4,404,506 | A | * | 9/1983 | Nishimura et al. ......... 318/561 |
| 4,547,854 | A | | 10/1985 | Hashimoto et al. ......... 364/474 |
| 4,608,644 | A | | 8/1986 | Kiya ............................ 364/474 |
| 4,608,645 | A | * | 8/1986 | Niwa et al. ................... 700/176 |
| 4,992,948 | A | | 2/1991 | Pilland ................... 364/474.15 |
| 5,081,332 | A | * | 1/1992 | Sakuragawa ............. 219/69.13 |
| 5,378,218 | A | * | 1/1995 | Daimaru et al. ................ 483/9 |
| 5,408,064 | A | | 4/1995 | Takahara ................. 219/69.18 |
| 5,914,883 | A | | 6/1999 | Riva et al. .............. 364/474.23 |
| 5,984,506 | A | * | 11/1999 | Robbiani et al. ........... 700/162 |
| 6,225,589 | B1 | | 5/2001 | Bartok .................... 219/69.15 |

FOREIGN PATENT DOCUMENTS

| DE | 2 128 667 | 12/1972 |
| DE | 32 46 268 | 7/1983 |
| DE | 196 14 202 | 11/1997 |
| DE | 197 24 926 | 12/1997 |
| EP | 0 311 703 | 10/1987 |
| EP | 0 295 264 B1 | 2/1993 |
| EP | 0 801 340 | 4/1997 |
| JP | 63-252688 | 10/1988 |
| JP | 8-197337 | 8/1996 |
| JP | 10-263988 | 10/1998 |
| WO | 95/11488 | 4/1995 |

OTHER PUBLICATIONS

Hoppmann, R. and Ising U., "Computergestutzte Werkzeugverwaltung in Bearbeitungszentren", etz Bd. 110 (1989), heft 20, pp. 1072–1075.

"Low–cost–CNC: Fit mit 32 bit", VDI–Z 132 (1990), Nr. 11—Nov., pp. 113–121.

Herrscher, A. and Walter, W., "Unterschiedliche Maschinen mit einem System programmieren", Werkstatt und Betrieb 123 (1990) 2, pp. 113–117.

(List continued on next page.)

Primary Examiner—Leo Picard
Assistant Examiner—Steven R. Garland
(74) Attorney, Agent, or Firm—Burns, Doane, Swecker & Mathis, L.L.P.

(57) ABSTRACT

A method and a device for controlling a number of machining processes on a machine tool with the help of a control device (20) that controls at least one tool for performing said number of machining processes under the direction of a control program, whereby the control program is created using a description of the tools required for performing the machining processes, and whereby the data for describing the tool are hereby divided in memories (24, 25) of the control device (20) into: (a) abstract tool data for describing a standard tool (V1, V2), and (b) specific tool data for correcting and/or adapting the abstract tool data to the actually used tool (R1, R2) or to machine-specific characteristics, whereby the tool description in the control program is obtained by linking the abstract tool data with the specific tool data.

22 Claims, 5 Drawing Sheets

OTHER PUBLICATIONS

"Objektorientiert Programmierein," Prof. Dr.–Ing. Eversheim Lenhart; Industrie–Anzeiger 82/1991, p. 38–40.

Storr, A., Hofmeister, W.: Strukturen zur Programmierung von NC–Mehrschlittendrehmaschinen, In: wt–Produktion und Management 84, 1994, p. 26–30.

Batz, Thomas et al.: Objektorientierte Modellierung von Produktionsprozessen. In: Informatik Forsch. Entw., 1995, p. 26–40.

Planken, Bettina, et al.: Mit der richtigen Entwicklungsumgebung zum Erfolg. In: Elektronik, 25, 1994, p. 111–124.

"NC/CNC Handbuch '92" by Hans B. Kief; 1992; pp. 194–195 and 370–372.

\* cited by examiner

| A | | B | |
|---|---|---|---|
| Type | Phase | Workstep | Pulse |
| ▼ | .1 R1 | 1<br>2 | 1138<br>1137 |
|  | .2 R2 | 3<br>4<br>5<br>6 | 1138<br>1137<br>1136<br>1135 |
| ▼▼ | .1 R3 | 7<br>8<br>9<br>10<br>11 | 1135<br>1134<br>1133<br>1131<br>1129 |
|  | .2 R4 | 12<br>13<br>14 | 1133<br>1131<br>1129 |
| ▼▼▼ | .1 R5 | 15<br>16<br>17<br>18<br>19 | 1129<br>1126<br>1123<br>1121<br>1119 |

Fig. 6

METHOD AND DEVICE FOR CONTROLLING A MACHINE TOOL, IN PARTICULAR, A DIE-SINK EROSION MACHINE

CROSS-REFERENCE TO RELATED APPLICATIONS

The present application corresponds to German Patent Application No. 198 56 116.4, filed in Germany on Dec. 4, 1998, the entire content incorporated herein by reference.

BACKGROUND OF THE INVENTION

1. Field of the Invention

The present invention relates to a method for controlling multiple machining processes on a machine tool, and in particular, to a method for controlling multiple machining processes on a die-sink erosion machine, and a device suitable for this purpose.

2. Description of Related Art

Such machine tools usually have a numerical control, e.g., an NC or CNC control. The control data required for the numerical control, such as position and/or path or contour data, as well as the parameter data of the desired workpiece machining, are transmitted to the control device in the form of control inputs and are converted there into control signals, e.g., for servo drives of the machine tool. An example of this is a spark erosion machine, specifically a die-sink erosion machine. Such die-sink erosion machines are used, among other things, for manufacturing molds with extremely high machining precision. A number of machining processes are hereby performed on one or more workpieces. Depending on the machining type, such as roughing or finishing, often different tool categories, i.e., different types of sinker electrodes, are used for performing these machining processes. If, in addition, the geometry or contour of the performed machining changes, the electrode of the die-sink erosion machine also must be changed in most cases. This means that depending on the number, versatility, and quality requirements of the machining processes to be performed in a modern die-sink erosion machine, the machining electrodes that are used must be changed several times during the total duration of the tool machining.

When setting up a die-sink erosion machine for such a complex machining, the machine operator must in the control device of the machine set the control inputs that determine which work steps of a machining job must be performed in which sequence with which machining electrode on which workpiece. Standard, state-of-the-art control processes of the initially mentioned type require control inputs in the form of closed "programs", so-called sequential control programs, for this purpose. Such a control program defines all control data in respect to machining and machining electrode for each point in time during the overall machining. The control data that were obtained from the control inputs are defined in sequential order. When changing the machining tool, which happens very frequently with a die-sink erosion machine, the entire tool description must each time be repeated in its entirety in the control program and may have to be edited if different types of tools are used. With increasingly more complex overall machining, it becomes more and more time-consuming for the machine operator to create the control program and change it, if needed. In addition, for economical reasons machine standstills should be avoided if at all possible.

The state of the art indeed also includes methods for the so-called object-oriented programming of machine tools, for example from: Prof. Dr. Ing. Eversheim, Dipl.-Ing. Lenhart, Objektorientiert Programmieren, in: Industrie-Anzeiger 82/1991, p. 38–40. In contrast to sequential control programs, these methods use program components that can be reused over and over again for changing the control program. But in this context, an object-oriented structure of the source program is suggested, in which the technical and geometrical information of a workpiece to be produced and/or of the machine tool are categorized in different object classes. A reprogramming in this process presents a direct manipulation of the source program which, as a rule, can only be performed by a machine operator with special programming skills.

Similar methods are known from the following sources: STORR, A., HOFMEISTER, W.: Strukturen zur Programmierung von NC-Mehrschlittendrehmaschinen. In: wt—Produktion und Management 84, 1994, p. 26–30; BATZ, Thomas, et al.: Objektorientierte Modellierung von Produktionsprozessen. In: Informatik Forsch. Entw., 1995, p. 26–40; and PLANKEN, Bettina, et al.: Mit der richtigen Entwicklungsumgebung zum Erfolg. In: Elektronik, 25, 1994, p. 111–124. The previous explanations apply analogously to these methods.

OBJECTS AND SUMMARY

The invention at hand attempts to improve machine tools, in particular die-sink erosion machines, with respect to their user-friendliness during setup and/or any reprogramming during the machining.

Accordingly, one aspect of the present invention creates a method for controlling a number of machining processes on a machine tool with the help of a control device that controls at least one tool for performing said number of machining processes under the direction of a control program, whereby the control program is created using a description of the tool(s) required for performing the machining processes, and whereby the data for describing the tool are hereby divided in the control device into: (a) abstract tool data for describing a standard tool (V1, V2); and (b) specific tool data for correcting and/or adapting the abstract tool data to the actually used tool (R1, R2) or to machine-specific characteristics, whereby the tool description in the control program is obtained by linking the abstract tool data with the specific tool data. For this purpose, the control device, for example, a CNC control, is provided with at least one data memory for the permanent storing the abstract tool data and the specific tool data as well as with a user interface for linking the abstract tool data with selected, specific tool data.

The abstract tool data already contain all essential information about the tool(s) required and planned for performing a specific (individual) machining job. Such a machining process (from hereon called a "machining job") on a workpiece provides a specific, desired geometry or contour of the tool machining job, for example a specific die-sink contour of a die-sink erosion, in a specific machining quality, for example a specific machining quality, such as roughing, pre-smoothing or finishing, so that a machining job in most cases requires the use of several tools of different quality categories. This is therefore related to the description of standard or specified tools required for performing a specific, desired machining job, whereby this abstract description also contains all essential machining-specific information of the tools, for example the basic tool geometry, the basic tool shape, the tool material, the tool type, for example whether it is a roughing or a smoothing electrode of a die-sink erosion machine. The specific tool data then contain only the correction data, for example in respect to the exact dimensions of the actually used tool, such as the actual smaller than specified size, which may differ from the (assumed) smaller than specified size of the specified tool, as well as machine-specific data, such as, for example, the exact chucking position of the tool, the current position in a tool magazine for an automatic tool change or the current wear status of the actually used tool.

The basic idea of the invention is therefore to generalize the tool description, i.e., to abstract it independently from the actually encountered situation in the machine tool and the actual tools used in the description of a standard tool, so that the tool description can already be performed before the actual machining, outside the workshop. When setting up the machine tool, the machine operator is able to utilize an already existing abstract tool description and supplement it with only those control inputs related to the specific tool data, and in this way is able to set the entire tool description for the control device. These inputs permit an especially speedy programming of the machine tool at the work site, and ajust as speedy modification programming or reprogramming of complex machining sequences in which the abstract and specific data groups can be combined as desired and reused over and over again in the manner of data modules.

It is preferred that an intelligent data generator automatically determines the sequence of the technology and process parameters of individual work steps of a particular machining job on the basis of the abstract tool data together with the geometrical and machining contour data and technology and process parameter sets available in databases.

In a particularly preferred application of the control concept according to the invention in a die-sink erosion machine, several electrodes for performing a particular machining job are combined by an administration system of the control device into an electrode family. The data describing the electrode family are hereby divided in the control device into: (a1) family data applying to all electrodes of the electrode family, for example related to electrode material and basic electrode geometry; (a2) abstract electrode data (so-called data of virtual electrodes) that contain information about a standard electrode for performing a particular machining job; and (b) specific electrode data about the electrodes actually used for performing this machining job (so-called data of real electrodes).

The family data are superordinate to the abstract and specific electrode data; otherwise the abstract and specific electrode data correspond to the previously mentioned concept of the abstract and specific tool description. The overall description about an electrode or electrodes required for a specific machining job is obtained from the sum of the abstract and specific electrode data and the superordinate family data of the electrode family. By using the control's user interface, a separate electrode can be specified for a number of different machining processes that again comprise several work cycles, each of which has several work steps, i.e., in that the electrode administration system of the control assigns several different real electrodes belonging to the same electrode family to, for example, a virtual electrode. It is preferred that different types of electrode families are provided for different machining jobs, i.e., for different die-sink contours or die-sink geometry, where, depending on the number of work cycles and/or work steps, said electrode families contain different electrodes that are defined by the combination of specific and abstract data.

In a preferred embodiment, the structure of the machine control of the die-sink erosion machine is object-oriented. It is preferred that hereby two object structures are provided. One object structure relates to performing the total of all machining processes, whereby the following objects that are hierarchically ranked in the following descending order are provided: the die-sink erosion machine as such, a tool table, a pallet or workpiece group, a workpiece, a machining job group, a machining job, a work cycle, and/or a work step. In addition to this machining object structure, the machine control comprises a tool object structure that relates to the tools required for all of the machining processes and has the following objects: an electrode family group, an electrode family and/or virtual electrode and a real electrode. When the program is created, the objects of the tool object structure are linked with selected objects of the machining object structure.

An "object" is defined as an organizational and functional unit of the die-sink erosion machine on which measures for completing the desired workpiece machining are performed by the control of the die-sink erosion machine. The division or assignment of control measures to such objects, for example to the electrode family group object that applies to all hierarchically subordinate objects permits the machine operator to directly set up the control of the die-sink erosion machine in the workshop, i.e., specify the measures to be performed on the object, without detailed knowledge of the source program.

In a further preferred embodiment of the tool description according to the invention, the abstract tool data, and in particular electrode data, also contain data about the life span of a tool, i.e., the maximum number of machining processes or work cycles of a particular machining for which a tool can be used. This information permits the preferred setup of an automatic tool administration or tool management system in the control of the die-sink erosion machine. Once a certain tool has performed the maximum permissible number of machining processes, it is automatically excluded by the administration system from further machining or is assigned to another machining type for which this tool can still be used. By using the tool description according to the invention, such a downgrading is achieved by linking the previous specific tool data with a set of new, abstract tool data that contain information for performing the downgraded machining type.

As a supplement to the tool administration according to the invention, the specific data preferably also contain information about the current wear status and/or maximum permissible wear of a particular tool. This information can be obtained in different ways. In the case of a die-sink erosion machine in which several machining jobs, each of which has several work steps that again are combined into work cycles, are performed consecutively, the maximum electrode wear is specified by the maximum number of work cycles or work steps that can be performed with an electrode by way of an electrode administration system that counts and registers the number of performed work cycles or work steps during the machining.

BRIEF DESCRIPTION OF THE DRAWINGS

The following examples describe preferred exemplary embodiments of the invention in reference to the enclosed drawing. This will show additional advantages and characteristics of the invention. In the drawing.

DETAILED DESCRIPTION OF THE PREFERRED EMBODIMENTS

The following describes the concept of the tool description according to the invention in reference to the example of a die-sink erosion machine. To complete a die-sink with a specific geometry (corresponds to a machining process or machining job), different types of electrodes are used consecutively for different erosion stages, such as roughing, smoothing or finishing. In order to change the electrodes, the die-sink erosion machine, for example, also has an automatic electrode changer. In most cases, several identical or different die-sinks are completed on the same workpiece, so that as a result an electrode change is frequently necessary during die-sink eroding.

Figure 1:
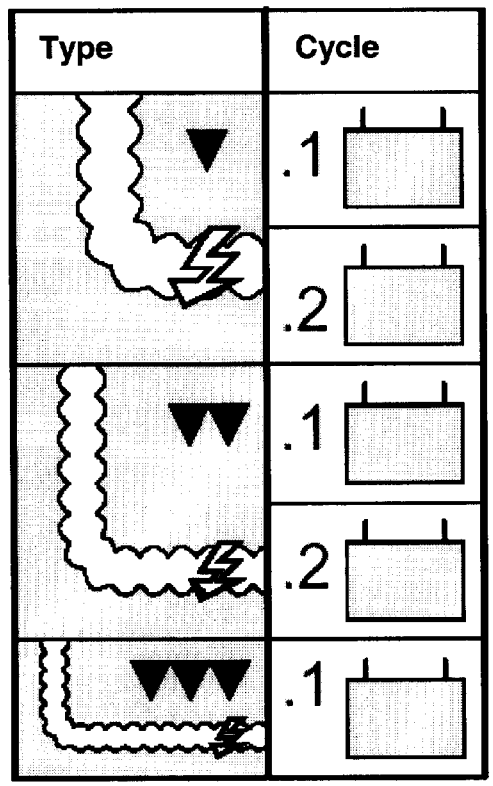
FIG. 1 shows a schematic view of a sequence of work cycles of different machining types of a single machining job.

FIG. 1 shows a generalized example of a machining job on a die-sink erosion machine. The machining job includes three machining types performed consecutively with different electrode types, i.e., a roughing process $\triangledown$, a pre-smoothing process $\triangledown\triangledown$, followed by a smoothing process $\triangledown\triangledown\triangledown$. See the left column in FIG. 1. According to the right column in FIG. 1, the roughing process $\triangledown$ and the pre-smoothing process $\triangledown\triangledown$ each are divided into two work cycles which again may include several work steps.

The smoothing process $\triangledown\triangledown\triangledown$ is performed in one cycle. The right column also schematically shows the sinker electrodes used for this purpose. Two electrodes are used for roughing $\triangledown$, two electrodes for pre-smoothing $\triangledown\triangledown$, and a single electrode for smoothing $\triangledown\triangledown\triangledown$. This means that each machining pass also can be performed with different electrodes in order to prevent excess electrode wear.

To perform such a machining job, the control device requires control inputs regarding the electrodes to be used, geometry and contour data, process and technology parameters, and possibly regarding the machining sequence. Based on these data, a control program in which the order of the individual work steps with the respective technology and process data is defined is created for the specific machining job.

The invention at hand also provides the machine operator with a tool for more efficiently describing the various electrode types. For this purpose, different types of electrodes for performing a specific machining job are combined into a so-called electrode family and are considered to be an object in an object-oriented structure of the die-sink erosion machine control. Such an electrode family includes those (different) electrode types that are used for performing a specific machining job. Accordingly, the same electrode family then includes all those electrodes that have at least the same basic geometry and a predefined smaller than specified size able to achieve the same final dimensions. An object of the electrode family can be used for several (identical) machining jobs, i.e., for all machining jobs in which a corresponding die-sink geometry should be achieved.

Figure 2:
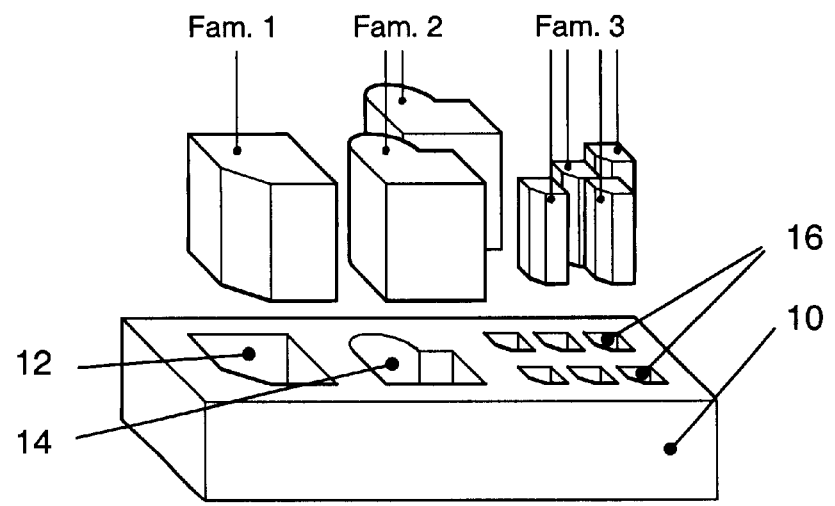
FIG. 2 shows a schematic view of different electrode families according to the organizational concept of the invention at hand.

FIG. 2 schematically illustrates the concept of the electrode families with a workpiece 10 on which three types of machining jobs in the form of die-sinks 12, 14, 16 are supposed to be performed. Each of the machining jobs 12 and 14 should be performed once, and the machining job 16 should be performed six times on the workpiece 10. According to the control concept of the invention, all electrodes planned for a specific machining job are combined into one family. In FIG. 1, this is for machining job 12 the electrode family Fam. 1 that consists of a single electrode, for machining job 14 the electrode family Fam. 2 that consists of two electrodes of a different type, and for machining jobs 16 the electrode family Fam. 3 consisting of four electrodes of a different type, whereby at least one electrode is used several times.

The control device of the die-sink erosion machine requires a comprehensive description of the electrodes to be used for performing such machining jobs. According to the concept of the invention, three data areas are provided in the control for describing the electrodes:

a) Data of the electrode family (so-called family data)

The family data contain information applying to all electrodes of a specific electrode family, i.e., are quasi placed "before the parentheses" of the characteristics of the various electrodes of an electrode family. This includes essentially information about: Electrode material (the choice of the electrode material determines the paired materials (electrode/workpiece) of the erosion, so that the control will be able to automatically determine the matching technology parameters. But if the members of an electrode family have different materials, the electrodes differing from the material defined on the family level must be specified on a subsequent data level); as well as basic electrode geometry, i.e., information about the basic shape (for example, prismatic, lamella-shaped, pointed, or standard shapes), and information about the basic geometric dimensions.

b) abstract electrode data (data of so-called virtual electrodes)

The abstract electrode data contain information about the virtual electrodes planned for performing a specific machining job in a specific machining type. This is a description of a standard or specified electrode for performing the specific machining job which already contains all essential machining-specific information. Even based on these abstract data, the die-sink erosion machine control will be able to define the technology and process parameters of the work step sequences to be performed if the machining goals and geometry data have been predefined. The abstract electrode data includes, for example, information about: Electrode type for a specific machining type, for example, roughing, pre-smoothing, smoothing, or finishing electrode; number of planned virtual electrodes per machining type; theoretical smaller than specified size or standard smaller than specified size (smaller than specified size=diameter of final shape minus diameter of electrode) which may slightly differ from the smaller than specified size of the actually used (real) electrode (the control automatically determines the pulse frequency and number of pulses per electrode, along with the required quality goal, from the number of electrodes and the intended smaller than specified size); and the electrode life span expressed as the number of maximum number of work cycles that can be performed for each type of machining.

c) specific electrode data (data of so-called actual electrodes)

These are essentially correction data for the abstract electrode data of the virtual electrodes used for the adaptation in respect to the actually used real electrodes for performing a specific machining job (once or several times).

These correction data on the one hand relate to electrode-specific properties, for example, the actual smaller than specified size of the used electrode or information about the current electrode wear status, and on the other hand to machine-specific properties, such as information about the mode of the electrode change and position of the electrode on an automatic electrode changer or robot, information about the installation of the electrode in the die-sink erosion machine, for example, whether it is installed on the electrode head or on the workpiece table, correction values of the electrode position in order to determine the exact zero point of the electrode in relation to the zero point of the electrode head, etc.

Figure 3:
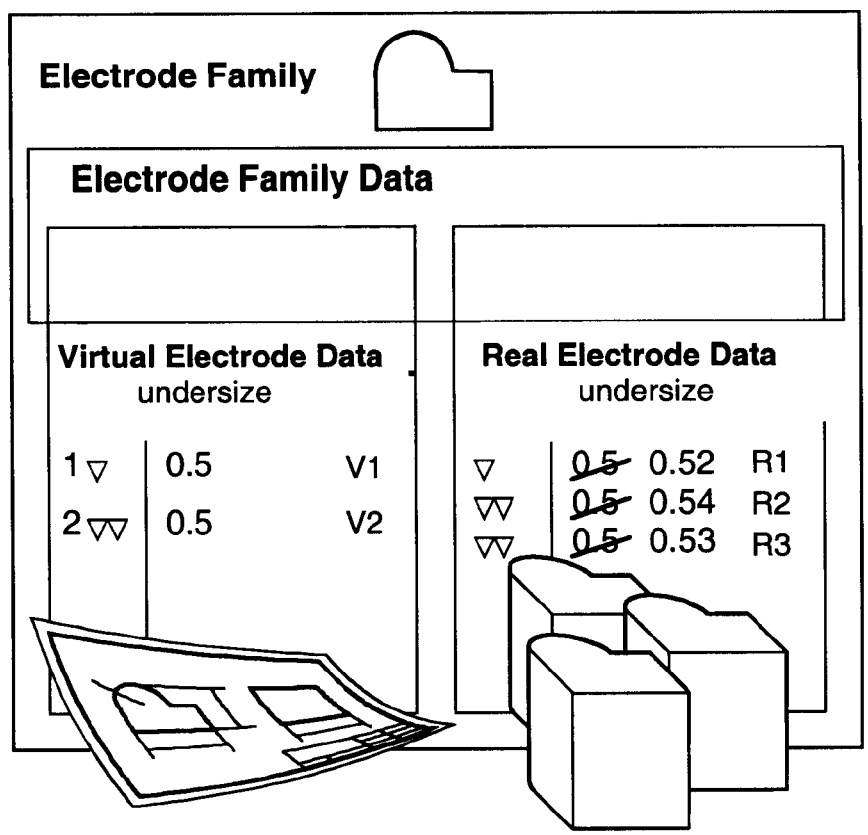
FIG. 3 shows a schematic view of the data structure of the electrode family according to the invention.

According to all of this, the total information of an electrode to be used in a specific work cycle of a machining job is obtained from the sum of its specific electrode data, the abstract electrode data, and the superordinate family data. FIG. 3 shows an example of the data organization of an electrode family according to the invention. The family data here relate to an essentially rectangular electrode shape with a lateral, semi-round projection on one longitudinal side and, for example, a copper electrode material. The data group of virtual electrodes contains information about a planned virtual roughing electrode V1 with a standard smaller then specified size of 0.5, and two planned virtual pre-smoothing electrodes V2, also with a standard smaller than specified size of 0.5. The virtual or standard electrodes V1, V2 are shown schematically in FIG. 3 with the technical drawing shown there. The data of the actually used, real electrodes shown to the right of this contain the actual values of the smaller than specified size. The real roughing electrode R1 has a smaller than specified size of 0.52, and the first roughing electrode R2 has a smaller than specified size of 0.53. The description of the work sequence at hand, i.e., "once roughing $\nabla$, twice smoothing $\nabla\nabla$" is therefore simply obtained by combining the data of the real electrode R1 with the data of the virtual electrode V1 as well as the data of the real electrode R2 with V2, and R3 with V2. This example shows that, based on the division and grouping of the electrode description, a flexible and speedy adaptation of the description to the actually used electrodes and/or any machine-specific circumstances is possible. If, for example, a new real electrode R4 with a different smaller than specified size is used, which is also positioned in a different position in the electrode changer, it is sufficient to only input the real data of this electrode R4 into the control and link them with the already existing virtual data of the desired electrode type, for example, the electrode V2, in order to obtain the total description of the new electrode. For this purpose, the control device according to the invention provides a graphic interface in which family data, abstract electrode data, and specific electrode data can be input and optionally linked with each other inside suitable windows.

Figure 4A:
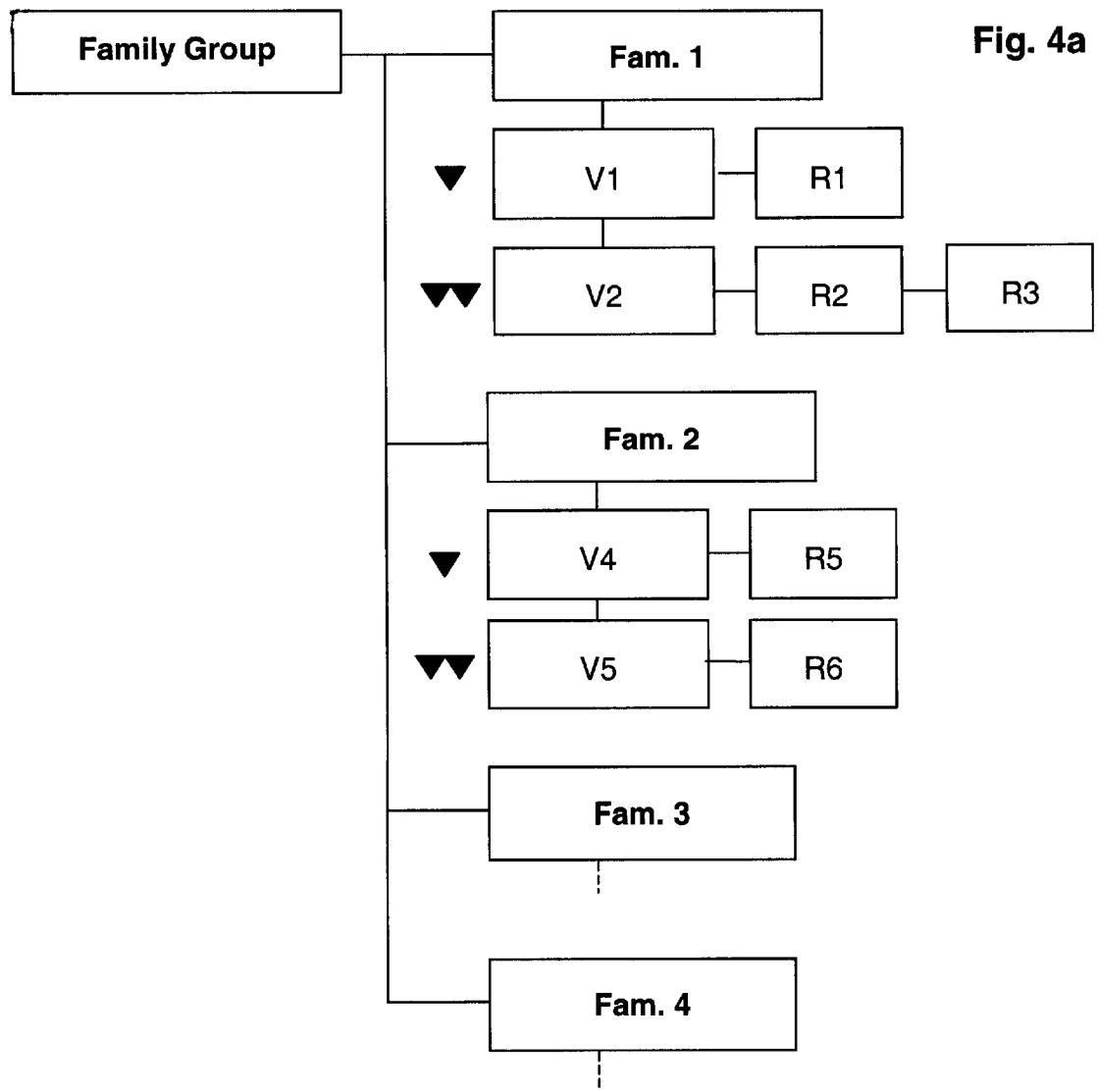
FIGS. 4a and 4b show a schematic view of the object structure of various electrode families and associated real or virtual electrodes.
Figure 4B:
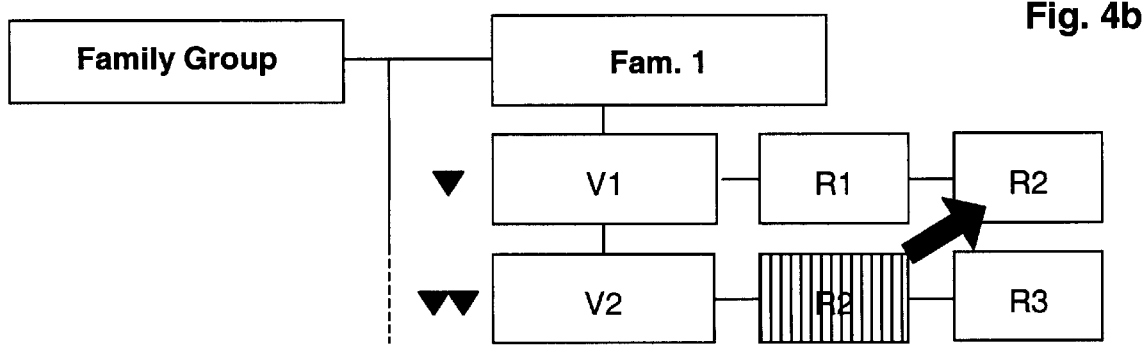

FIGS. 4a and 4b show additional examples of the data structure according to the invention for describing different types of electrodes. In FIG. 4a, a total of four electrode families are defined, each of which is provided for performing a specific machining job. In the electrode family Fam. 1, a roughing electrode has been specified with the assignment R1, V1, and two different smoothing electrodes have been specified with the electrode combinations R2, V2 and R3, V2. Other machining jobs that differ from the first machining job are performed with electrode families Fam. 2, Fam. 3, and Fam. 4, the electrodes of which are again defined by the combination of real and virtual electrode data. Within the framework of an object-oriented structure of the entire control of the die-sink erosion machine according to the invention, the electrode families Fam. 1 to Fam. 4 have been assigned another superordinate object "family group". As a result, the measures determined for the family group apply generally also for all electrode families Fam. 1 to Fam. 4.

As has been mentioned already, the abstract electrode data for describing the virtual electrodes also contain information regarding the life span of the electrode, i.e., for example, in the form of the maximum number of permissible work cycles for a machining job. The CNC machine control according to the invention also is provided with an electrode administration system having a counter device that continuously counts the number of work steps or work cycles performed and stores them in a memory for the specific electrode data. If a specific real electrode reaches the maximum permissible number of work cycles, the electrode is excluded by the administration system of the machine control from further use, or—if possible—is downgraded for use in another type of machining. A pre-smoothing electrode which after a certain number of pre-smoothing cycles is no longer suitable for pre-smoothing because of electrode wear, for example can still be used as a roughing electrode. FIG. 4b shows a schematic example of such a downgrading. The real electrode R2 here is initially defined as a pre-smoothing electrode $\nabla\nabla$ by the data combination R2, V2 in the electrode family Fam. 1. After its life span has expired (determined by the data of virtual electrode V2), R2 is downgraded to a roughing electrode $\nabla$. The total description as a roughing electrode is simply obtained by assigning to it the data of the already existing virtual electrode V1, which according to the invention already contains all information for performing a roughing process.

Figure 5:
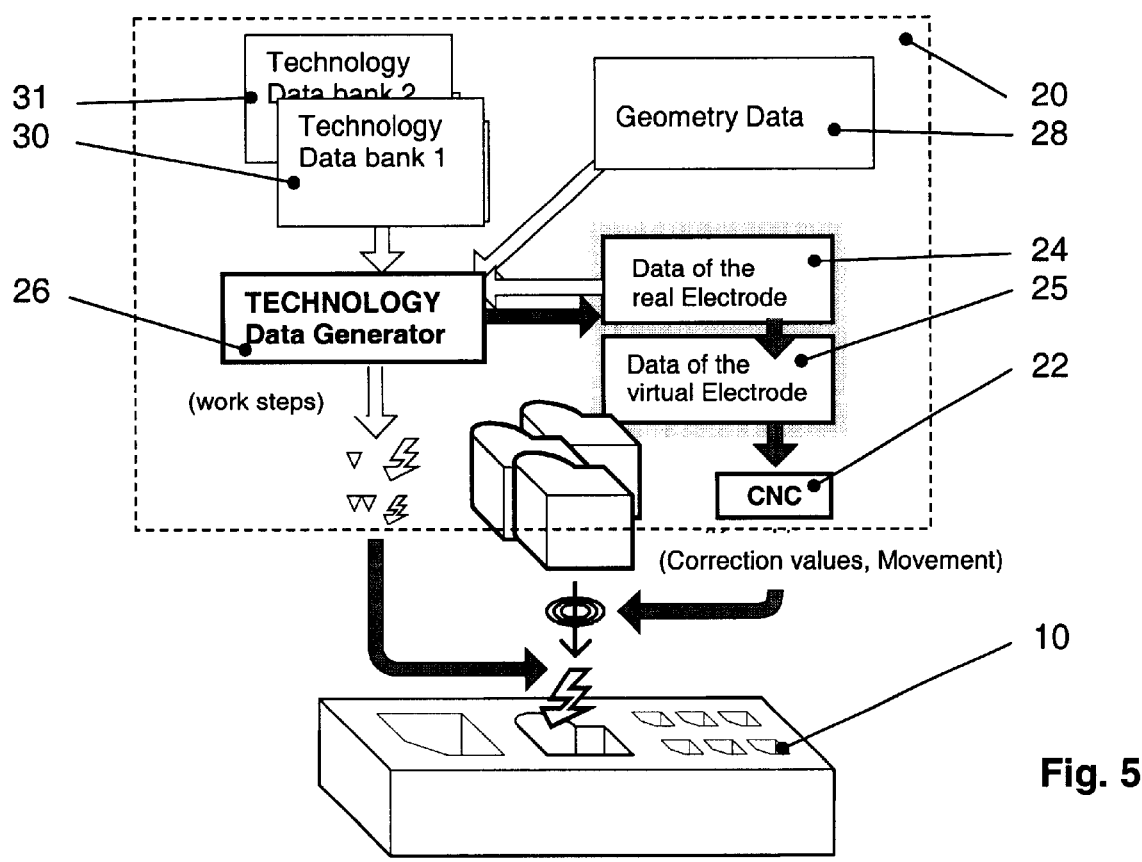
FIG. 5 shows a schematic view of a control system for generating and executing the machining sequences for performing one or more workpiece machining jobs; and, FIG. 6 shows a schematic view of user-defined predefined settings and control data generated by the control for the creation of a control program.

FIGS. 5 and 6 illustrate the invented CNC control of the die-sink erosion machine for creating a control program intended to perform the total of all machining processes on a workpiece.

FIG. 5 schematically shows a control system 20 of the CNC control of the die-sink erosion machine for controlling different machining jobs on the workpiece 10 (cf. FIG. 1). The control system 20 has an interpolator 22 which controls the relative movement between workpiece and sinker electrode necessary for the workpiece machining. For this purpose, a drive is provided that is, for example, coupled with the tool table and is movable in X, Y, and Z main axis directions and receives the control signals of the interpolator 22. The control system 20 requires a control program which, in addition to position data of the workpiece(s), progression or contour data of the desired die-sink contour, also contains technology data, such as machining precision, roughness, etc., and process parameter data, such as erosion current, pulse shape, pulse frequency, flushing data, etc.

The die-sink erosion machine's control system 20 according to the preferred embodiment of the invention automatically generates the control program for performing a sequence of work steps. For this purpose, the data of the virtual electrodes (abstract electrode data) are stored in memory 24, and the data of the real electrodes (specific electrode data) are stored in memory 25 of control system 20. The geometry and contour data of various machining jobs are furthermore stored in memory 28, and various technology and process parameter data sets for performing the machining jobs are stored in databases 30 and 31. An intelligent data generator 26 now automatically determines on the basis of the data of the virtual electrodes from memory 24, the geometry data from memory 28, and the technology and process data from databases 30 and 31, the technology and process parameter data used in the work step sequences. This assignment step is shown schematically in FIG. 5 with the light arrows.

The CNC machine control also has an electrode administration unit 33 for monitoring the electrode life span and for excluding or downgrading an expired electrode in the previously described manner.

At the moment the work steps defined in this manner are performed (cf. dark arrows in FIG. 5), the interpolator 22 accesses the real data stored in memory 25 and reads the data for controlling the electrode movement. The data of the real electrodes are hereby integrated as correction values into the already defined work steps: the correction values, for example, determine the zero point position of the real electrodes related to the zero point of the electrode head; the actual sub-specification dimension of the electrodes is used to control the planetary movements.

FIG. 6 again illustrates the process of technology generation as performed in the data generator 26 of the control system 20 shown in FIG. 5. Under bar A, the user-defined data of the virtual and real electrodes for the respective machining type and associated work cycles or phases are stated in the way they are present in memories 24 and 25 of the control system 20. This user-defined part hereby corresponds to the illustration in FIG. 1 so that reference is hereby made to the respective explanations. Below bar B, the technology data generated by the control, in particular by the data generator 26, for the individual associated work steps are provided, i.e., as examples in the form of the defined number of pulses for performing the work steps with the respective user-defined electrodes R1 to R5 that are different types of electrodes.

The present invention has been described with reference to a preferred embodiment. However, it will be readily apparent to those skilled in the art that it is possible to embody the invention in specific forms other than as described above without departing from the spirit of the invention. The exemplary embodiment is illustrative and should not be considered restrictive in any way. The scope of the invention is given by the appended claims, rather than the preceding description, and all variations and equivalents which fall within the range of the claims are intended to be embraced therein.

What is claimed is:

1. A method for controlling a number of machining processes on a die sink erosion machine; wherein several electrodes each for performing a specific machining process are combined into an electrode family the method comprising
   dividing data in a control device describing an electrode family into:
   (a1) family data applying to all electrodes of the electrode family;
   (a2) abstract electrode data containing information relating to a standard electrode for performing a specific machining process; and
   (b) specific electrode data about an electrode actually used for performing the specific machining process;
   creating a control program using a description of electrodes required for performing the machining processes by linking the abstract electrode data with the specific electrode data;
   controlling at least one electrode for performing the number of machining processes using the control program.

2. The method as claimed in claim 1, wherein the family data relates to electrode material and basic electrode geometry.

3. The method as claimed in claim 1, wherein for a sequence of work cycles, each having different work steps in a specific machining job, for each work cycle and/or each work step an electrode is determined by combining the abstract electrode data with various selected specific electrode data.

4. The method as claimed in claim 1, wherein the control of the die-sink erosion machine is structured as object-oriented, whereby a machining object structure has the following objects that are ranked in the following descending hierarchical order:
   the die-sink erosion machine as such,
   a tool table,
   a pallet or workpiece group,
   a workpiece,
   a machining job group,
   a machining job,
   a work cycle and/or a work step; and
      where in addition, a tool object structure has the following objects: an electrode family group,
   an electrode family and/or virtual electrode and a real electrode.

5. The method as claimed in claim 1, wherein the abstract electrode data contain data about a life span of a tool.

6. The method as claimed in claim 1, wherein the specific electrode data contain information about current wear status and/or maximum permissible wear of a particular electrode.

7. The method as claimed in claim 1, wherein maximum electrode wear is predefined by a maximum number of work cycles or work steps that can be completed with the same electrode, and that during the machining a number of work cycles or work steps is continuously counted and registered.

8. The method as claimed in claim 7, wherein, upon reaching the maximum electrode wear, a particular electrode is excluded from further machining or downgraded to another type of electrode.

9. The method as claimed in claim 1, wherein the family data relates to electrode material and electrode geometry.

10. A device for controlling a die-sink erosion machine, the device comprising:
    a data memory for permanent storing of family data applying to all electrodes of an electrode family;
    a data memory for permanent storing of abstract electrode data containing information relating to a standard electrode for performing a specific machining process;
    a data memory for permanent storing of specific electrode data about an electrode actually used for performing the specific machining process; and
    a user interface for selecting specific electrode data and linking the abstract electrode data with the selected specific electrode data.

11. The device as claimed in claim 10, further comprising:
    a data memory for geometry and contour data of different machining jobs;
    a data memory for at least one database for technology and process parameter sets for performing machining sequences; and
    a data generator for automatically determining a sequence of the technology and process parameter data of individual work steps based on the abstract electrode data, the geometry and contour data, and the technology and process parameter data.

12. The device as claimed in claim 11, further comprising an interpolator which reads the specific electrode data from the data memory and uses them to correct tool movement.

13. The device as claimed in claim 10, further comprising an interpolator which reads the specific electrode data from the data memory and uses them to correct tool movement.

14. The device as claimed in claim 10, for controlling the die-sink erosion machine, further comprising an administration system that registers a number of work cycles or work steps performed during a machining job with the same electrode, and excludes the electrode from further machining or downgrades it to another electrode category after a maximum number of permissible work cycles or work steps has been reached.

15. The device as claimed in claim 10, wherein the family data relates to electrode material and electrode geometry.

16. A device for controlling a die-sink erosion machine, the device comprising:

means for permanently storing (a1) family data applying to all electrodes of an electrode family; (a2) abstract electrode data containing information relating to a standard electrode for performing a specific machining process; and (b) specific electrode data about an electrode actually used for performing the specific machining process; and means for selecting specific electrode data and linking the abstract electrode data with the selected specific electrode data.

17. The device as claimed in claim 16, further comprising:

means for storing geometry and contour data of different machining jobs and technology and process parameter sets for performing machining sequences; and means for automatically determining a sequence of the technology and process parameter data of individual work steps based on the abstract electrode data, the geometry and contour data, and the technology and process parameter data.

18. The device as claimed in claim 17, further comprising an interpolator which reads the specific electrode data from the data memory and uses them to correct tool movement.

19. The device as claimed in claim 18, for controlling the die-sink erosion machine, further comprising an administration system that registers a number of work cycles or work steps performed during a machining job with the same electrode, and excludes the electrode from further machining or downgrades it to another electrode category after a maximum number of permissible work cycles or work steps has been reached.

20. The device as claimed in claim 16, further comprising an interpolator which reads the specific electrode data from the data memory and uses them to correct tool movement.

21. The device as claimed in claim 16, for controlling the die-sink erosion machine, further comprising an administration system that registers a number of work cycles or work steps performed during a machining job with the same electrode, and excludes the electrode from further machining or downgrades it to another electrode category after a maximum number of permissible work cycles or work steps has been reached.

22. The device as claimed in claim 16, wherein the family data relates to electrode material and basic electrode geometry.

* * * * *